United States Patent [19]

Bourggraff et al.

[11] 4,115,091

[45] Sep. 19, 1978

[54] METHOD AND APPARATUS FOR MANUFACTURING GLASS RIBBON ON A FLOAT BATH

[75] Inventors: Robert Bourggraff, Cologne, Fed. Rep. of Germany; Jean-Claude Coulon, Chalon sur Saone, France

[73] Assignee: Saint-Gobain Industries, Neuilly-sur-Seine, France

[21] Appl. No.: 796,810

[22] Filed: May 13, 1977

[30] Foreign Application Priority Data

May 20, 1976 [FR] France ................................ 76 15202

[51] Int. Cl.² ............................................. C03B 18/02
[52] U.S. Cl. .................................. 65/99 A; 65/182 R
[58] Field of Search .................. 65/65 A, 99 A, 182 R

[56] References Cited

U.S. PATENT DOCUMENTS

| 3,337,319 | 8/1967 | Edwards | 65/65 A X |
| 3,480,420 | 11/1969 | Loukes et al. | 65/65 A X |

FOREIGN PATENT DOCUMENTS

| 1,323,711 | 3/1963 | France | 65/65 A |
| 1,370,895 | 7/1964 | France | 65/99 A |
| 966,709 | 8/1964 | United Kingdom | 65/99 A |

Primary Examiner—Arthur D. Kellogg
Attorney, Agent, or Firm—Pennie & Edmonds

[57] ABSTRACT

A method and apparatus are disclosed for manufacturing glass ribbon by pouring molten glass onto a bath of molten metal. A portion of the molten metal is withdrawn from the molten bath underneath the molten glass, upstream from the location at which the molten glass forms the glass ribbon. The withdrawn molten metla is entrained by a reducing gas, and heated. The molten metal and reducing gas are introduced into the molten metal bath generally at a side region of the bath.

23 Claims, 3 Drawing Figures

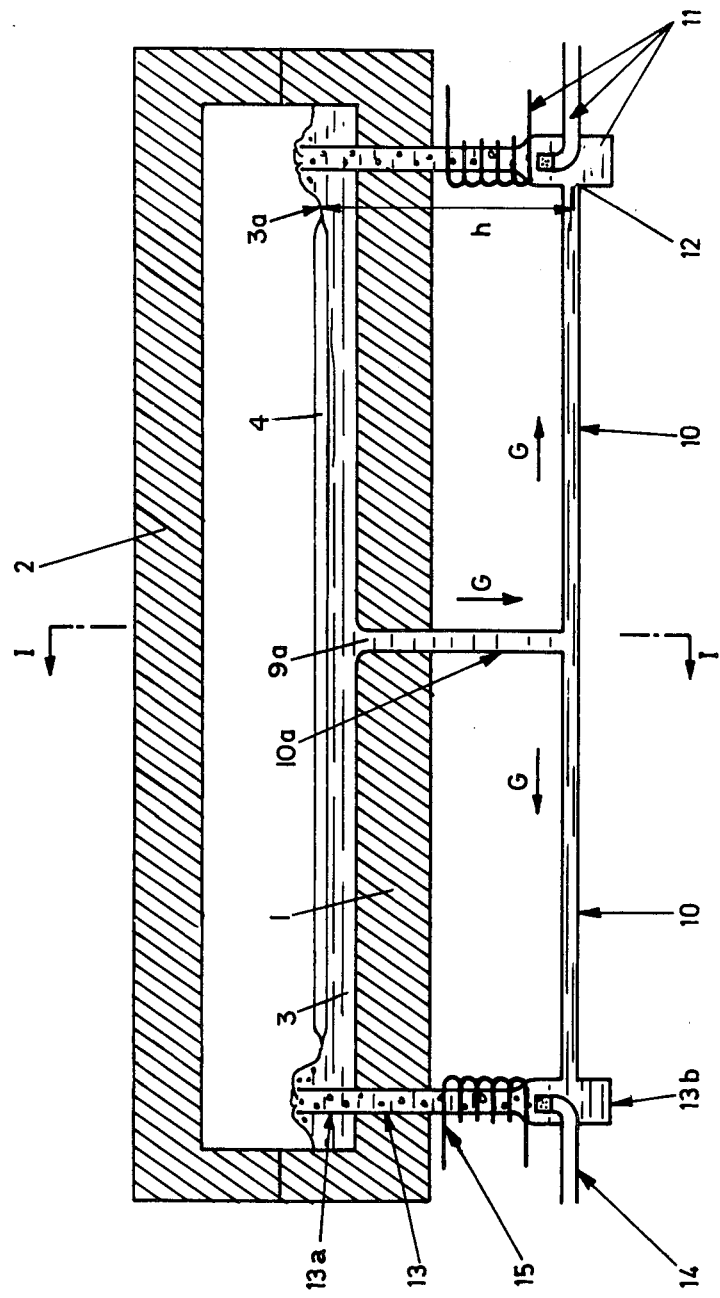

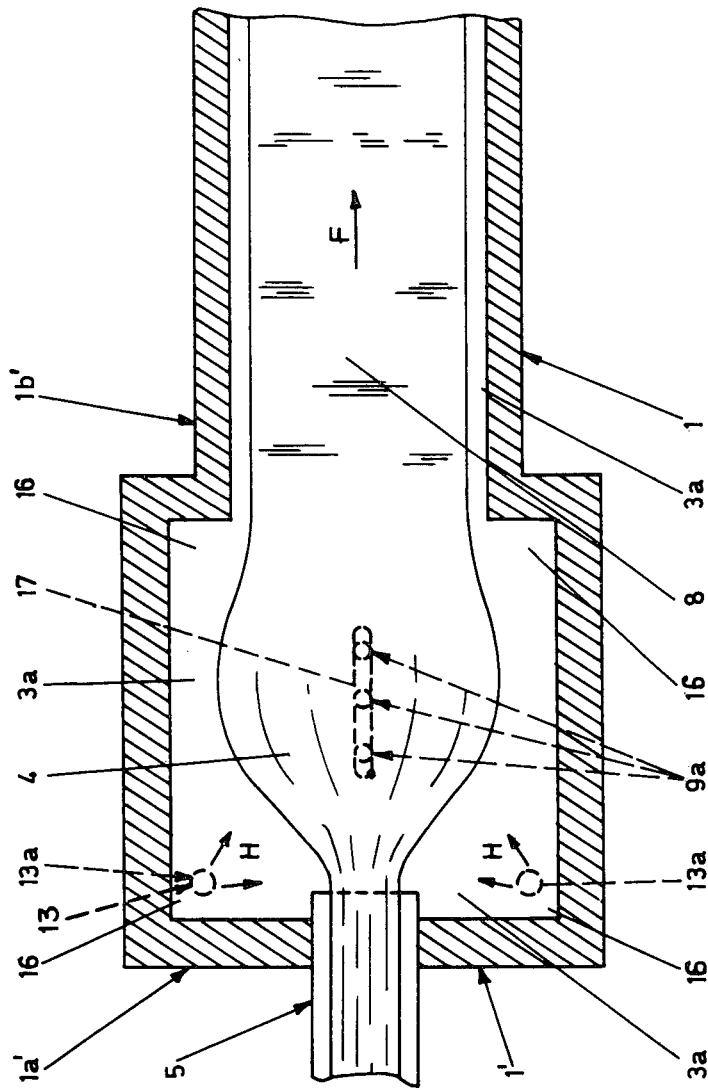

METHOD AND APPARATUS FOR MANUFACTURING GLASS RIBBON ON A FLOAT BATH

BACKGROUND OF THE INVENTION

1. Field of the Invention

This invention relates to the manufacture of glass ribbon by the flotation process.

2. Description of the Prior Art

In the flotation process for manufacturing glass ribbon, a layer of molten glass is poured onto a bath of molten metal contained within a tank. Because the density of the molten glass is less than that of the molten metal, it floats upon the molten metal bath. The glass is caused to advance along the length of the molten metal bath and is permitted to flow freely in a lateral direction so that the thickness of the molten glass is gradually reduced. As the molten glass advances, it is gradually cooled to form a flat glass ribbon floating upon the molten metal bath. Extraction rollers facilitate the forward motion of the glass ribbon and draw the relatively cool glass ribbon from the tank.

The molten metal bath normally consists of tin or a tin alloy. Since the metal bath is oxidized by contact with ambient air, it is shielded by a reducing gas atmosphere made of hydrogen and nitrogen. The protective atmosphere is retained within an enclosure positioned above the tank. The enclosure must have apertures for the admission of the molten glass and for the removal of the glass ribbon. Inevitably, ambient air passes through these apertures and reacts with the bath of molten metal to form oxides. This oxidizing reaction particularly occurs at the upstream area of the bath where the molten metal is relatively hot. The oxides float on the surface of the molten metal bath and are drawn by the glass ribbon to the point where it leaves the tank. As the glass ribbon leaves the tank, the oxides adhere to the lower surface of the glass ribbon. The oxides contaminate the glass ribbon thereby adversely affecting the quality of the manufactured glass.

To alleviate this oxide problem, various prior art processes have been developed. In a prior art process, molten metal is withdrawn from the downstream end of the tank and is mixed with hydrogen gas to reduce the metal and thereby decrease the number of oxides. The metal is then heated and reintroduced into the upstream end of the tank. However, the metal extracted from the downstream end of the tank is at a relatively cool temperature of 650° C. which is unsuitable for reduction reactions.

There are additional problems present in the flotation process. In recent years, the output for flotation glass plants has risen to 600 tons of glass ribbon per day. As the enormous amount of hot molten glass used to produce these large outputs is poured onto the molten metal bath, a large amount heat is transferred from the molten glass to the bath. The central region of the bath becomes considerably hotter than the side regions of the bath. It is desirable to reduce the thermal gradient thus formed across the molten metal bath to ensure that the glass ribbon floating upon the molten metal bath is free from transverse variations in its thickness.

In a prior art process, molten metal is caused to flow underneath the glass ribbon from the center of the bath toward each side of the molten metal bath. Although the thermal gradient is somewhat decreased by this process, it is never eliminated. The central regions remain undesirably hotter than the side regions of the molten metal bath. Further, although a continuously renewed molten metal surface contacts the lower surface of the glass ribbon, the molten metal is not reduced because the glass ribbon separates the protective reducing atmosphere from the surface of the circulating molten metal. Thus the number of oxides contaminating the metal bath are not significantly decreased.

SUMMARY OF THE INVENTION

We have invented a method and apparatus for manufacturing glass ribbon which eliminates the above-described oxide and transverse thermal gradient problems.

As in the prior art methods, molten glass is poured onto a bath of molten metal and advanced along the molten metal bath so as to form a glass ribbon. The surface of the molten metal bath is exposed to a protective reducing atmosphere. In the method of the present invention, a portion of the molten metal is withdrawn from the molten metal bath underneath the molten glass upstream from the location at which the molten glass forms a congealed glass ribbon. A reducing gas such as hydrogen is entrained within the withdrawn molten metal, the withdrawn molten metal is heated and this molten metal and reducing gas are introduced into the molten metal bath generally between the location of entry of the molten glass onto the bath and a side region of the bath.

In a preferred embodiment, the molten metal and reducing gas are introduced into the molten metal bath generally near or on the surface of the bath at an upstream corner of the molten metal bath. The reducing gas separates from the heated molten metal and is dispersed within the protective atmosphere. The molten metal withdrawn from the bath may be heated to a temperature sufficient to raise the temperature of the side regions of the bath to that of the molten metal located underneath the molten glass.

The apparatus comprises a tank containing a bath of molten metal and having upstream and downstream portions. As in the prior art, the apparatus also comprises means for directing molten glass onto the molten metal in the upstream portion of the tank, means for advancing the molten glass along the tank so as to form a congealed glass ribbon within the downstream portion of the tank, and means for removing the glass ribbon from this portion of the tank. A conventional enclosure means is disposed above the tank to contain a protective atmosphere such as a mixture of nitrogen and hydrogen. As part of our invention, the apparatus also comprises means for conducting at least a portion of the molten metal from the upstream portion of the tank underneath the molten glass to a side region of the upstream portion of the tank. There is also included entraining means such as a conduit for bubbling the reducing gas into the conducting means to entrain the gas within the molten metal and means for heating the metal in the conducting means.

BRIEF DESCRIPTION OF THE DRAWINGS

Preferred embodiments of the invention are described hereinbelow with reference to the drawings wherein:

FIG. 2 is a sectional view taken along line II—II of FIG. 1; and

FIG. 3 is a sectional plan view of another embodiment of a flotation apparatus according to the present invention.

DETAILED DESCRIPTION OF THE PREFERRED EMBODIMENTS

Figure 1:
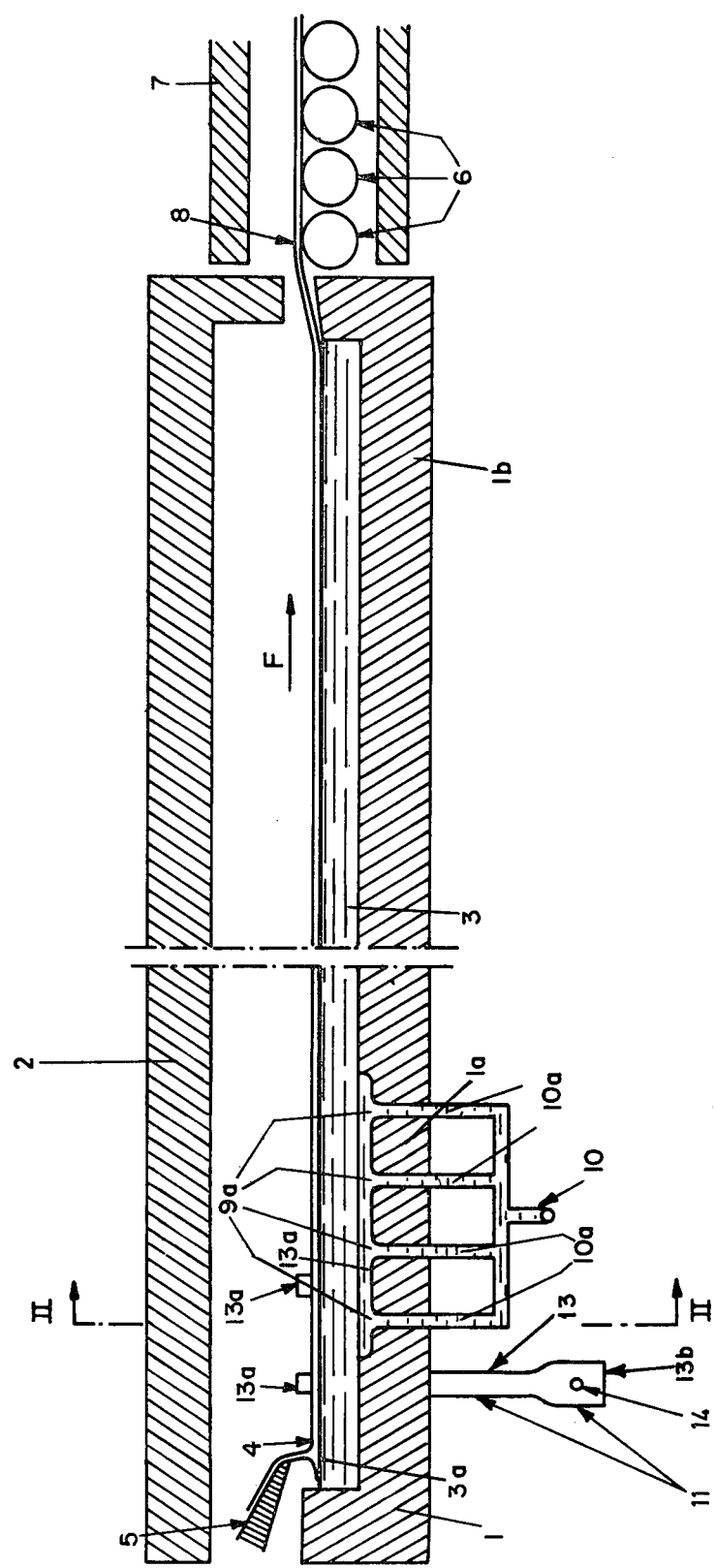
FIG. 1 is an elevational sectional view of a flotation apparatus according to the present invention.

FIG. 1 is a sectional side view of an illustrative apparatus for producing a glass ribbon by the flotation process. The apparatus comprises a tank 1, a cover 2 and a annealing lehr 7. Tank 1 is covered by cover 2 and annealing lehr 7 is positioned downstream of tank 1. Molten glass is poured from an overflow 5 onto a molten metal bath 3 which is contained within tank 1. Roller 6 is positioned within annealing lehr 7 and draws the molten glass along the length of tank 1 so as to form a glass ribbon 8. The section of FIG. 1 is parallel to the longitudinal axis of glass ribbon 8. Tank 1 is made of fire-resistant materials and is divided into an upstream portion 1a containing molten glass and a downstream portion 1b containing congealed glass ribbon 8. Molten metal bath 3 usually consists of molten tin or a tin alloy. It is shielded by a protective reducing atmosphere such as a mixture of nitrogen and hydrogen gas. The mixture is retained over molten metal bath 3 by cover 2. There is also shown in FIG. 1 a device 11 and conduits 10a and 10 utilized for circulating molten metal. For clarity, the portion of conduit 10 connected to device 11 is not shown.

FIG. 2 is a transverse sectional view of the flotation apparatus of FIG. 1. There is shown an aperture 9, and conduits 10a, 10 and 13. Aperture 9 is defined in the bottom of upstream portion 1a of tank 1, underneath molten glass 4 generally toward the transverse center of upper portion 1a of tank 1. An upper end of conduit 10a is connected to aperture 9a and its lower end is connected to horizontal conduit 10. In turn, conduit 10 is connected to device 11 at point 12 located below surface 3a of metal bath 3 at a vertical distance $h$. Device 11 comprises conduit 13, electric heating coil 15 and conduit 14. Conduit 13 is advantageously vertical and passes through another aperture defined within the bottom of tank 1 at a side region of upstream portion 1a. The upper end of conduit 13 illustratively terminates above surface 3a of molten metal bath 3. Conduit 14 and conduit 10 are connected to lower end 13b of conduit 13.

Referring to FIGS. 1 and 2, a sheet of glass is made by pouring molten glass 4 onto molten metal bath 3 in upper portion 1a of tank 1. Molten glass 4 spreads over molten metal bath 3 and advances along tank 1 in the direction of arrow F. As it proceeds, it is gradually cooled to form a flat, congealed glass ribbon 8 at downstream portion 1b of tank 1. Extraction rollers 6 draw glass ribbon 8 from downstream portion 1b of tank 1.

Molten metal flows through apertures 9a and fills conduits 10a so as to form at least a first column of molten metal. It then passes through conduit 10 in the directions of arrow G and into lower end 13b of conduits 13. The molten metal fills conduits 13 so as to form at least a second column of molten metal.

Reducing gas is passed through conduit 14 into each lower end 13b of conduits 13. This gas is injected at a pressure sufficient to overcome a column of molten metal within conduit 13 having height $h$ and is bubbled into the molten metal of conduit 13 so as to be entrained therein. The gas bubbles force the molten metal to rise in conduit 13 and spill out upper end 13a. As the molten metal rises, it is simultaneously reduced by the reducing gas, and the molten metal oxides present with the molten metal are advantageously eliminated.

Heating coils 15 surround conduits 13 and heat the molten metal contained therein. Since the density of this molten metal becomes less than that of the molten metal within conduit 10, the heating coils assist in causing the molten metal of conduits 13 to rise through conduits 13 and spill out their upper ends 13a.

The heated, reduced molten metal then mixes with the molten metal located within the side regions of upper portion 1a of tank 1 and raises the temperature of these side regions. Advantageously, heating coils 15 are regulated so that the temperature of the side regions of the bath eventually becomes as great as the temperature of the molten metal located at the same point along the longitudinal axis of the tank underneath molten glass 4. The transverse temperature gradient of upper portion 1a of tank 1 is thus significantly reduced or eliminated.

As the molten metal and reducing gas leave conduit 13, the reducing gas separates from the molten metal and is dispersed within the protective atmosphere. Since gas bubbles trapped underneath the molten glass would undesirably affect the quality of the manufactured glass ribbon, upper ends 13a of conduits 13 extend above surface 3a of molten metal bath 3. The reduction gas is thus readily dispersed into the protective atmosphere. Advantageously, conduits 13 are positioned between overflow 5 and side walls of tank 1. The currents produced in the bath by the mixing of the molten metal from conduits 13 with the molten metal bath occur at a sufficient distance so as not to affect the flow of the molten glass.

The reducing gas introduced through conduit 14 may consist of hydrogen. Advantageously, it is a mixture of hydrogen and nitrogen having the same composition as the protective atmosphere. Under the present invention, the conditions for reduction are ideal because the temperature of the molten metal may be as high as 1000° C. and the gas is uniformly dispersed into the molten metal. Thus, it is only necessary to utilize a small amount of dangerous hydrogen for reduction. For example, the gas injected into column 13 may be only 3 to 10 percent by volume hydrogen and the remainder being nitrogen.

FIG. 3 illustrates an additional embodiment of the apparatus for manufacturing a glass ribbon according to our invention. There is shown a tank 1' having an upstream portion 1a' and a downstream portion 1b'. The width of upstream portion 1a' is greater than that of downstream portion 1b'. As indicated, upstream portion 1a' is rectangularly configured having four corners 16. Molten glass 4 is poured onto surface 3a of a molten metal bath, forming a floating molten layer which progressively widens as it advances along the tank. The upper portion 1a' of tank 1' is sufficiently wide so that molten glass 4 does not spread to its side regions. Corners 16 of upper portion 1a' are advantageously free from the molten glass. As molten glass 4 advances and enters downstream tank portion 1b', it contracts and forms a congealed glass ribbon. Conduits are advantageously positioned within the upstream corners of upstream portion 1a' of tank 1'. The molten metal spilling out of upper ends 13a of the conduits flows in direction H and rapidly disperses within the molten metal bath. The currents thereby produced do not affect the flow of molten glass 4.

Referring to FIGS. 1 and 3, a channel 17 may be defined within the bottom of tank 1 disposed above apertures 9a and positioned in a direction parallel to the advancing molten glass. Channel 17 minimizes the creation of current caused by the convergent flow of molten metal into apertures 9a. These currents would distort the surface of the glass ribbon. Additionally, apertures 9a can be beveled at their edges so as to prevent the formation of vortices as the molten metal enters apertures 9a.

As a result of the present invention, there is provided a continuous flow of molten metal from underneath the molten glass to the side regions of the upper portion of the tank. The molten metal is continuously reduced and heated so as to eliminate the oxide formation and transverse thermal gradient problems.

While the invention has been described in conjunction with certain embodiments thereof it is to be understood that various modifications and changes may be made without departing from the spirit and scope of the invention.

We claim:

1. In a method for manufacturing a glass ribbon wherein molten glass is directed onto a bath of molten metal within a protective atmosphere, the molten glass being advanced along the molten metal bath so as to form a congealed glass ribbon, the improvement which comprises,
    (a) withdrawing a portion of the molten metal from the molten metal bath, underneath the molten glass, upstream from the location at which the molten glass forms a congealed glass ribbon;
    (b) entraining a reducing gas within the withdrawn molten metal;
    (c) heating the withdrawn molten metal; and
    (d) recycling the withdrawn heated molten metal and reducing gas into the molten metal bath above the surface level of the bath and generally between the location of entry of the molten glass onto the bath and a side region of the bath.

2. The method according to claim 1 wherein the withdrawn molten metal is heated to a temperature sufficient to raise the temperature of the side region of the metal bath to a temperature approximately equal to that of the molten metal located underneath the molten glass.

3. The method according to claim 1 wherein the heated molten metal and reducing gas are introduced into the molten metal bath generally near the surface of the bath.

4. The method according to claim 3 further comprising the step of allowing the reducing gas to separate from the heated molten metal as both are being introduced into the molten metal bath, said reducing gas being comprised of hydrogen.

5. The method according to claim 4 further comprising the step of allowing the separated reducing gas to be dispersed within the protective atmosphere.

6. The method according to claim 1 wherein the heated molten metal and reducing gas are introduced generally at an upstream corner of the molten metal bath, the width of said bath decreasing in the downstream direction.

7. The method according to claim 1 wherein both the protective atmosphere and said reducing gas have a composition ranging from approximately 3 to 10 percent by volume hydrogen and 97 to 90 percent by volume nitrogen.

8. In an apparatus for manufacturing a glass ribbon having a tank disposed within a protective atmosphere for containing a bath of molten metal with means for directing molten glass onto the molten metal bath at an upstream location of the tank and means for advancing the molten glass along the tank to form a congealed glass ribbon at a downstream location of the tank and for removing the glass ribbon therefrom, the improvement which comprises,
    (a) means for conducting at least a portion of the molten metal from the upstream portion of the tank underneath the molten glass to a side region of the upstream portion of the tank;
    (b) means connected to the conducting means for entraining a reducing gas within said conducted molten metal;
    (c) means for heating said conducted molten metal,
    (d) said conducting means comprises a first conduit having a first end passing through a first aperture in the upstream portion of the tank located underneath the molten glass and a second end passing through a second aperture located toward the side of the upstream portion of the tank, said first end terminating below the surface of the molten metal bath; and
    (e) wherein the second end of said first conduit terminates above the surface of the molten metal bath.

9. The apparatus according to claim 8 wherein the entraining means comprises a second conduit connected to said first conduit for bubbling reducing gas through the first conduit.

10. The apparatus according to claim 8 whrein the heating means comprises a heating coil surrounding the first conduit.

11. The apparatus according to claim 8 wherein the width of the upstream portion is greater than that of the downstream portion of the tank.

12. The apparatus according to claim 11 wherein the second end of the first conduit terminates above the surface of the molten metal bath at an upstream corner of the upstream portion of said tank.

13. The apparatus according to claim 8 wherein the second end of the first conduit terminates above the surface of the molten metal bath at an upstream corner of said tank.

14. The apparatus according to claim 8 wherein said first aperture in the tank is beveled at its edge.

15. The apparatus according to claim 8 wherein the bottom of the upstream portion of the tank defines a channel disposed above said first aperture and positioned parallel to the advancing direction of the molten glass.

16. The apparatus according to claim 8 wherein the first aperture is disposed generally at the transverse center of the upstream portion of the tank.

17. The apparatus according to claim 8 wherein the upstream portion of the tank defines at least one aperture located underneath the molten glass and at least a second aperture located toward the side of the upstream portion of the tank, and said conducting means comprises a first conduit having a first end connected to each of said first apertures and a second end passing through each of said second apertures, said second end terminating above the surface of the molten metal bath.

18. The apparatus according to claim 17 wherein the bottom of the upstream portion of the tank defines a channel disposed above each of said first apertures, the channel and first apertures being positioned parallel to the advancing direction of the molten glass.

19. The apparatus according to claim 18 wherein the width of the upstream portion is greater than that of the downstream portion of the tank.

20. The apparatus according to claim 19 wherein the second end of the first conduit terminates above the surface of the molten metal bath at an upstream corner of said upstream portion of said tank.

21. The apparatus according to claim 20 wherein at least one of said first apertures is beveled at its edge.

22. The apparatus according to claim 19 wherein the channel and each of said first apertures are located generally toward the transverse center of the upstream portion of the tank.

23. The apparatus according to claim 8 wherein the conducting means conducts molten metal from below the molten glass to a point near a surface of the molten metal.

* * * * *